United States Patent [19]
Peterman et al.

[11] Patent Number: 6,140,819
[45] Date of Patent: Oct. 31, 2000

[54] CONTINUOUS-DEPTH-INDICATING UNDERGROUND PIPE AND CABLE LOCATOR

[75] Inventors: Earl J. Peterman, Philo; David L. Peterman, Redwood Valley, both of Calif.

[73] Assignee: Heath Consultants, Inc., Houston, Tex.

[21] Appl. No.: 09/084,839

[22] Filed: May 26, 1998

[51] Int. Cl.[7] .............................. G01V 3/08; G01V 3/10; G01R 19/00

[52] U.S. Cl. ............................................ 324/326; 324/67

[58] Field of Search .................................. 324/67, 207.11, 324/207.17, 207.19, 207.22, 207.26, 237, 243, 326, 327, 328, 329

[56] References Cited

U.S. PATENT DOCUMENTS

| | | | |
|---|---|---|---|
| 2,501,598 | 3/1950 | Eltenton et al. | 175/183 |
| 3,471,772 | 10/1969 | Smith | 324/3 |
| 3,617,865 | 11/1971 | Hakata | 324/3 |
| 3,893,025 | 7/1975 | Humphreys, Jr. | 324/67 |
| 3,967,282 | 6/1976 | Young et al. | 343/5 |
| 3,991,363 | 11/1976 | Lathrop | 324/52 |
| 4,091,322 | 5/1978 | Stankoff | 324/3 |
| 4,103,791 | 8/1978 | Ullmann | 214/138 R |
| 4,134,061 | 1/1979 | Gudgel | 324/54 |
| 4,220,913 | 9/1980 | Howell et al. | 324/52 |
| 4,249,630 | 2/1981 | Lougheed et al. | 180/168 |
| 4,295,095 | 10/1981 | Thomas et al. | 324/326 |
| 4,387,340 | 6/1983 | Peterman | 324/326 |
| 4,520,317 | 5/1985 | Peterman | 324/326 |
| 4,691,165 | 9/1987 | Szedlmajer | 324/326 |
| 5,001,430 | 3/1991 | Peterman et al. | 324/326 |
| 5,093,622 | 3/1992 | Balkman | 324/326 |
| 5,194,812 | 3/1993 | Yokoi | 324/326 |
| 5,640,092 | 6/1997 | Motazed et al. | 324/326 |

FOREIGN PATENT DOCUMENTS

| | | |
|---|---|---|
| 2 239 008 | 10/1975 | France . |
| 52-81979 | 7/1977 | Japan . |
| 389482 | 7/1971 | U.S.S.R. . |
| 1 509 914 | 5/1978 | United Kingdom . |
| 2 006 438 | 5/1979 | United Kingdom . |

*Primary Examiner*—Walter Snow
*Attorney, Agent, or Firm*—Thomas E. Schatzel; Law Offices of Thomas E. Schatzel, A Prof. Corp.

[57] ABSTRACT

An underground pipe and cable locator for continuous depth readings comprises a top and bottom receiver antenna sensor each connected to respective amplifier channels. A separate transmitter is used to stimulate electromagnetic radiations from a buried pipe, cable, or other electrical conductor. The bottom receiver antenna sensor is sampled and used to synchronize a phase locked loop controlled oscillator. The exceedingly faint and noise-riddled signals obtained from the top and bottom receiver antenna sensors are full-wave rectified without the use of rectifiers or diodes that can introduce distortions and offsets. Such signals are full-wave rectified by synchronously switching between inverted and non-inverted copies with an analog switch such that only the positive cycles of each are output in one pulse train. A continuous output is therefore obtainable from the top and bottom receiver antenna sensors, and this, in turn, permits a continuous display of the depth estimate of the buried conductor.

11 Claims, 3 Drawing Sheets

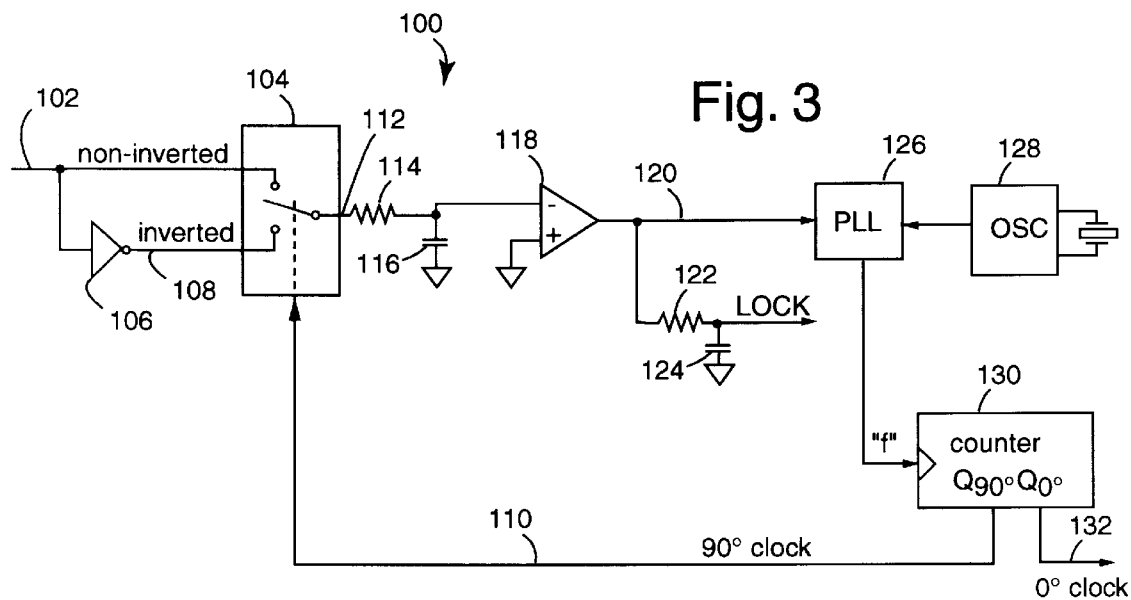

CONTINUOUS-DEPTH-INDICATING UNDERGROUND PIPE AND CABLE LOCATOR

BACKGROUND OF THE INVENTION

1. Field of the Invention

The present invention relates generally to underground locators, and more specifically to portable above-ground equipment that can indicate the depth and lateral position of selected underground pipes and cables radio-illuminated by a tag transmitter or other source.

2. Description of the Prior Art

The public safety and convenience depend on contractors being able to accurately understand where underground utilities are buried and how deep they are placed. Otherwise, gas, water, and sewer pipes can be punctured, or telephone, electric, or CATV cables can be cut when an excavator accidentally comes across the service. Some such accidents have resulted in wide-area outages, and even direct injury and death to nearby construction workers, passersby and residents. Many jurisdictions therefore require contractors and other excavators to contact a "one-call" service before digging so that a crew can come out and mark the existing underground structures to be avoided. Unfortunately, the prior art locating equipment has often not been up to the job of providing sufficiently accurate and reliable depth measurements, and so these jurisdictions usually stop short of having the underground depths marked.

A prior art method of measuring the depth of an underground pipe or cable radio-illuminates the hidden structure by attaching a transmitter to some part of it. For example see, U.S. Pat. No. 3,991,363, issued to Thomas Lathrop on Nov. 9, 1976. A portable receiver with at least two vertically separated antennas is walked above ground at the surface until the transmitter's signal is intercepted. The portable receiver is then repositioned directly over the radio-illuminated underground pipe or cable. Since the signal strength of the electromagnetic radiations can be depended upon to attenuate with the distance traveled, a pair of field strength measurements taken at known elevations can be used to compute the depth of the source radiator. For an infinite line radiator, the signal strength will diminish as the inverse of the distance.

An early prior art attempt to make the depth of underground conductors continuously available from a locator is described by Mark Howell, et al., in U.S. Pat. No. 4,220,913, issued Sep. 2, 1980. The ratio of the signal amplitudes received by a pair of horizontal coil antennas is used for a depth indicator. But such a simple mechanism was plagued by amplifiers that were hard to match and that drifted, and a variety of noise sources some of which were more than enough to obscure the signal so much that the underground-conductor depth indication was not very reliable.

The present inventor, Earl Peterman, described one way to address the mismatch of channel amplifiers for the top and bottom signal sensors in U.S. Pat. No. 4,520,317, issued May 28, 1985. A shared automatic gain-controlled amplifier is switched between the top and bottom antennas and the difference in readings is assumed to be the result of the two different field strengths experienced by each sensor. Any channel amplifier offsets and gain errors will be the same for each reading because the same channel amplifier was common to both readings. A practical limitation that was encountered with this circuit design was its continued susceptibility to noise. The field strengths of the signals of interest can be on the order of a few microvolts per meter, and measuring the small differences in field strength associated with the deeper objects has proved to be very challenging.

A method for the determination of the difference in field strengths of the signals received by the top and bottom sensors was described by present inventors, Earl and David Peterman, in U.S. Pat. No. 5,001,430, issued Mar. 19, 1991. The common gain-controlled amplifier switched between the top and bottom antennas was described as being digitally controlled. A reference level is established at one gain setting for the bottom antenna, and then that same level is matched for a reading from the top antenna by digitally adjusting the gain settings. The difference in field strengths for the top and bottom antennas is obtained by the digital difference of the gain settings needed to make the received signals equal.

It has now universally developed in most commercial depth-finding locators in the United States that the operators must stop and press a button in order to obtain a depth measurement. This mode of operation has resulted from having to share a single amplifier between the top and bottom sensor channels. But a continuous mode of depth measurement is needed in order to improve operator efficiency and increase confidence that a particular pipe or cable is being tracked from above at the ground surface.

SUMMARY OF THE PRESENT INVENTION

It is therefore an object of the present invention to provide a locator capable of continuous depth measurement and display.

It is another object of the present invention to provide a method for precisely matching the gains of receiver channels connected to antennas which must accurately measure very slight differences in field strength.

It is a further object of the present invention to provide a method for accurately reading microvolt per meter field strengths of locator signals in the presence of electrical noise and other interfering signals.

Briefly, a locator embodiment of the present invention comprises a top and bottom receiver antenna sensor each connected to respective amplifier channels. The bottom receiver antenna sensor is sampled and used to synchronize a phase locked loop controlled oscillator. The exceedingly faint and noise-riddled signals obtained from the top and bottom receiver antenna sensors are full-wave rectified without the use of rectifiers or diodes that can introduce distortions and offsets. Such signals are full-wave rectified by synchronously switching between inverted and non-inverted signal copies with an analog switch such that only the positive cycles of each are output in one pulse train.

An advantage of the present invention is that a method for underground pipe and cable location is provided that enables a continuous indication to a user of the depth of a conductor being tracked.

Another advantage of the present invention is that a method is provided for locating underground pipelines and cables that is dependable and accurate.

A further advantage of the present invention is that a locator is provided that has improved signal to noise response and therefore can be used to track underground conductors buried at greater depths compared to prior art devices.

These and other objects and advantages of the present invention will no doubt become obvious to those of ordinary skill in the art after having read the following detailed description of the preferred embodiments which are illustrated in the various drawing figures.

IN THE DRAWINGS

FIG. 3 is a schematic diagram of a PLL/clock/lock-detection subsystem useful in the locator embodiment of FIG. 1; and FIG. 4 is a schematic diagram of a dual-range channel processor useful in the locator embodiment of FIG. 1.

DETAILED DESCRIPTION OF THE PREFERRED EMBODIMENT

Figures 1A, 1B:
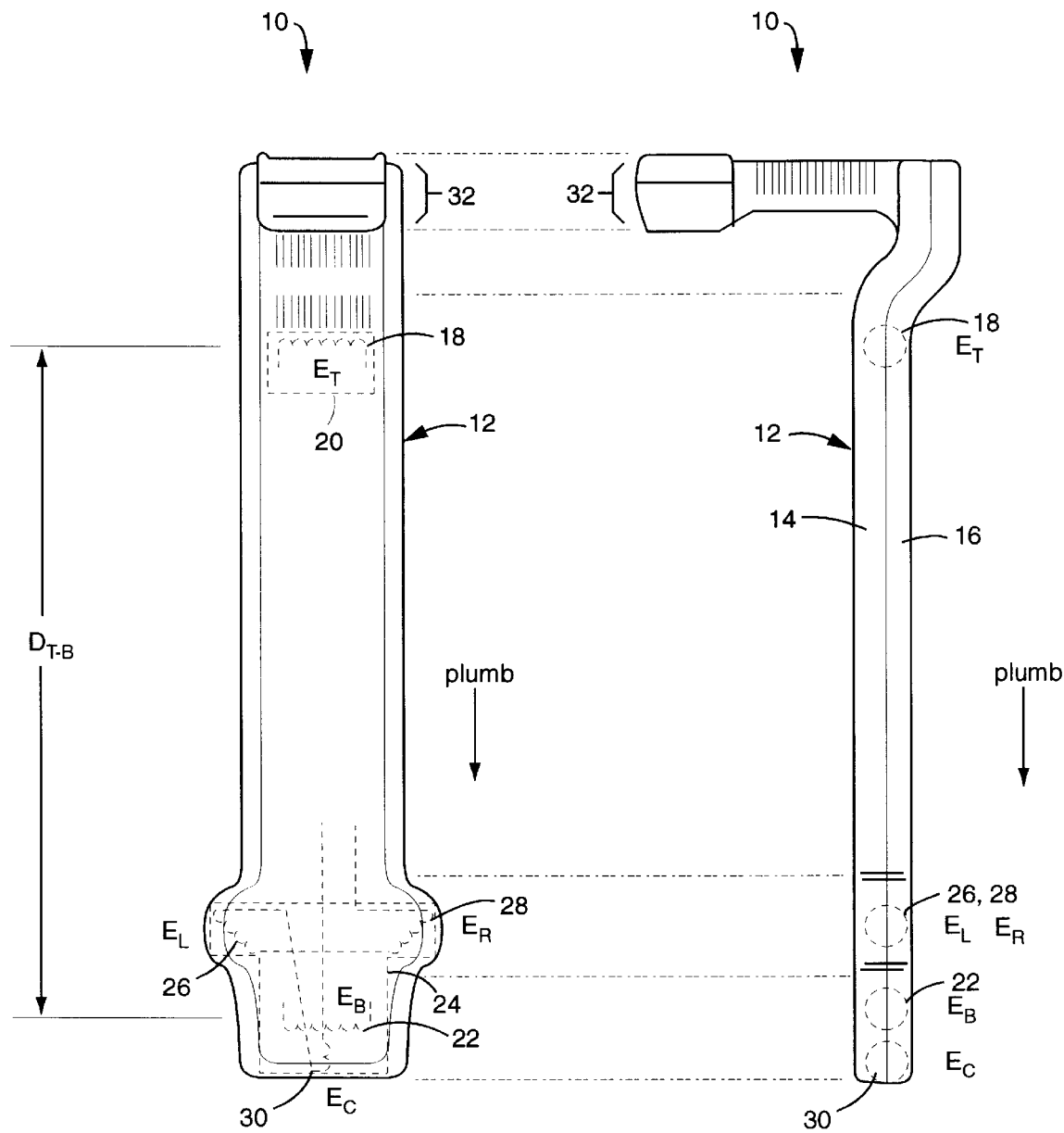
FIGS. 1A and 1B are plan and side view diagrams of an underground pipe and cable locator embodiment of the present invention (The terms "left" and "right" are arbitrary and are used here only in reference to FIGS. 1–4.)

FIGS. 1A and 1B illustrate an underground pipe and cable locator embodiment of the present invention, referred to herein by the general reference numeral 10. A separate transmitter is used to stimulate electromagnetic radiations from a buried pipe, cable, or other electrical conductor. Such electromagnetic radiations can then be tracked above ground by the locator 10.

The locator 10 comprises a lightweight plastic housing 12 that can be separated into front and back parts 14 and 16. The upper part of the housing 12 includes a top receiver antenna ($E_T$) 18 boxed inside an electrostatic shield 20. The lower part of the housing 12 includes a bottom receiver antenna ($E_B$) 22 boxed inside an electrostatic shield 24. A left wing part of the housing 12 includes a left receiver antenna ($E_L$) 26. (The terms "left" and "right" are arbitrary and are used here only in reference to FIGS. 1–4.) A right wing part of the housing 12 includes a right receiver antenna ($E_R$) 28. The bottom edge of the housing 12 includes a center receiver antenna ($E_C$) 30. A display head 32 includes all the operating electronics, bubble-level, user display, and batteries.

In an embodiment that provided good results, the top and bottom receiver antennas ($E_T$) 18 and ($E_B$) 22 each comprised a 3.0 L×0.330 D inch round ferrite rod with 480 turns of wire wound in segments to minimize capacitive coupling and maximize inductive-Q. The left and right receiver antennas ($E_L$) 26 and ($E_R$) 28 each comprised a 1.06 L×0.652 D inch round ferrite rod with 350 turns of wire also wound in segments to minimize capacitive coupling and maximize inductive-Q. The center receiver antenna ($E_C$) 30 comprised three turns on a 0.5 inch square form. The electrostatic shields 20 and 24 were constructed of carbon-painted surfaces inside the front and back parts 14 and 16 and connected to each other and signal ground by compression springs. The top and bottom receiver antennas ($E_T$) 18 and ($E_B$) 22 were separated by a distance ($D_{T-B}$) of about 25.5 inches. The signal-center of the bottom receiver antenna ($E_B$) 22 was located about one inch up from the bottom end of the housing 12. The signal-center of the center receiver antenna ($E_C$) 30 was located about one-half inch from the bottom end of the housing 12.

The locator 10 is intended to be used with its bottom end plumb to its top end, as shown by the plumb-line in FIGS. 1A and 1B. The outside edges of each of the left receiver antenna ($E_L$) 26 and right receiver antenna ($E_R$) 28 are preferably oriented with about a 1° tilt up from horizontal. During operation, the most accurate depth measurements are obtained when the top and bottom receiver antennas ($E_T$) 18 and ($E_B$) 22 are within a few degrees of plumb to one another, and the bottom end of the housing 12 is resting on the surface of the ground.

Figure 2:
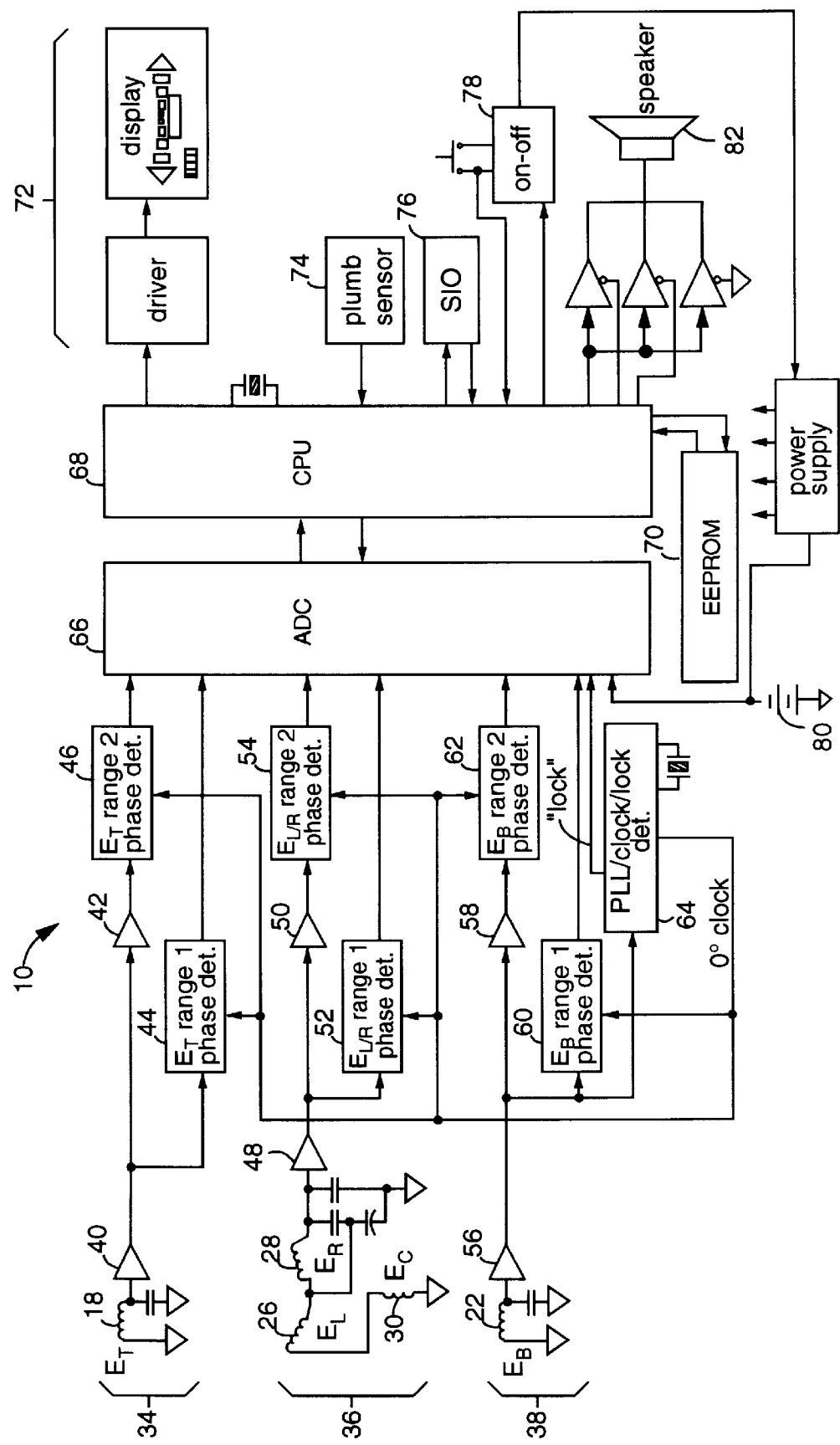
FIG. 2 is a simplified schematic diagram of a locator similar to that shown in FIG. 1.

FIG. 2 represents a simplified schematic diagram of the locator 10. The receiver antennas 18, 22, 26, 28 and 30 are grouped into three identical continuous-duty analog channels 34, 36, and 38 for signal processing. The top analog channel 34 includes the top receiver antenna ($E_T$) 18, a pre-amplifier 40 and 42, and a base and extended range synchronous full-wave rectifier-filters 44 and 46. (The base and extended range synchronous full-wave rectifier-filters also function as phase detectors and can be referred to that way, e.g., as in FIG. 2.) The power level of the electromagnetic signal sensed by the top receiver antenna ($E_T$) 18 is detected by a precise, near-zero-distortion conversion of the received AC signal to a DC value by the synchronous full-wave rectifier-filters 44 and 46.

The left, right and center antennas ($E_L$) 26, ($E_R$) 28 and ($E_C$) 30 are combined, as shown schematically, in analog channel 36 to produce one signal for a pair of pre-amplifiers 48 and 50, and a pair of base and extended range synchronous full-wave rectifier-filters 52 and 54. The bottom analog channel 38 includes bottom receiver antenna ($E_B$) 22, a pair of pre-amplifiers 56 and 58, and a pair of base and extended range synchronous full-wave rectifier-filters 60 and 62.

A phase-locked loop (PLL) 64 is used to lock onto the signal received by the bottom receiver antenna ($E_B$) 22. When locked-on, the PLL 64 provides an in-phase (0°) synchronous gating signal to each and all of the synchronous full-wave rectifier-filters 44, 46, 52, 54, 60, and 62. An analog LOCK signal is provided to a 20-bit binary analog-to-digital converter (ADC) 66, e.g., that will be within a particular range when the PLL 64 is actively tracking a signal.

A microprocessor (CPU) 68 is connected to multiplex-in each of the signal inputs of the ADC 66. CPU 68 is programmed to choose either a first range (range-1), e.g., inputs to ADC 66 from the synchronous full-wave rectifier-filters 44, 52, and 60; or a second range (range-2), e.g., inputs from the synchronous full-wave rectifier-filters 46, 54, and 62. An electrically-erasable programmable read-only memory (EEPROM) 70 is used to store calibration information that removes the gain and offset mismatches that exist between the three continuous-duty analog channels 34, 36, and 38.

A user display 72 provides a bar-arrow readout that indicates a left-right direction to follow an underground pipe or cable, and a numeric readout that continuously provides a depth estimate. If an operator is walking along with the locator 10 off-plumb more than a few degrees and tracking a target conductor, an estimated depth reading will be presented. Also, if the bottom of locator 10 is not resting on the surface, the depth readings will be off two or three inches. But, this is an extremely useful mode as it provides assurances that the operator is following the conductor he intends to track, and this mode gives important real-time information about any sudden or gradual changes in the depth of the conductor that are often associated with proximity to other utility lines, across driveways, etc.

A plumb sensor 74 can either be a bubble-level type which only provides a visual indication for a user, or a mercury-switch type that can indicate to the CPU 68 when the locator 10 is plumb. The mercury-switch type of plumb sensor 74 is preferred and is shown in FIG. 2.

A serial input-output (SIO) 76 provides, e.g., an RS-232 serial communications channel that can be used to up-load/down-load programs, data, and calibration information for CPU 68.

An on-off switch 78 can be operated to supply power from a battery 80 to the locator 10. A control line from CPU 68 is able to toggle power off, e.g., after a long period of inactivity to conserve battery life.

A speaker 82 is driven with a variety of audio tones, and/or synthesized voices, that are used to indicate to the user various operational conditions, e.g., off-left, off-right, centered, etc.

When the operator needs a depth reading with the highest possible accuracy, he can stop at any point along the track of the target conductor, place the bottom tip of the locator 10 on the surface above the conductor, and plumb the locator 10 with the bubble level. As soon as the locator 10 is within, e.g., 3° of plumb, and the left-right readout shows no more than a minimal deviation, the depth display 72 automatically changes mode to indicate a higher accuracy measurement.

In either mode, the depth readings are continuous and essentially real-time, and require no control actions of any kind to initiate the function. These features ensure new and important improvements in operation confidence, productivity and accuracy. Today's more complex underground utility situation demands more attention to these attributes, for reasons of safety and cost reduction. Embodiments of the present invention integrate the location and depth readout functions so an operator can consider both together before making any final surface-marking decisions.

A boot-program within the CPU 68 does a calibration of ADC 66, a test of user display 72, and a battery test. A start-up routine initializes a speaker driver, the user display 72, and sends an RS-232 interrupt to enter into a calibration mode.

During operation, a main loop has the ADC 66 continuously sample all of its multiplexed inputs including the PLL lock-range voltage and a battery-voltage sense line, and then outputs an estimate of the remaining battery capacity on the user display. An eight kHz trace mode can then commence. If the LOCK input to the ADC 66 is within a preferred range then the word "lock" is displayed on the user display 72. CPU 68 chooses which input range to use for calculations depending on the pre-amplified and amplitude detected level for the bottom receiver antenna ($E_B$) 22. The left/right amplitude is calculated by a compression algorithm to give a left-right direction to the user on the user display 72. If the direction to the underground conductor is left, then a first steady tone is output to the speaker 82, otherwise if the direction is to the right a different speaker frequency can be output. The depth is calculated by using a conventional depth equation, and the result is displayed. A suitable algorithm to calculate depth is described by the present inventor, Earl Peterman, in U.S. Pat. No. 4,520,317, issued May 28, 1985. Such patent is incorporated herein by reference.

FIG. 3 illustrates a PLL/clock/lock-detection subsystem 100. A synchronous quadrature full-wave rectifier is included which receives a non-inverted sample signal on an input 102 to an analog multiplexer 104, e.g., a part of a 74HC4053 or CD4053 triple 2-channel analog multiplexer-demultiplexer. A unity-gain analog inverter 106 provides an inverted copy of the input 102 on an input 108. A gate control 110 is timed to select the input 102 during the second 90° of its positive cycle and the first 90° of its negative cycle, and then switch to the input 108 to gate through the same two portions of the inverted copy for the last half of each gate control clock cycle. An output 112 is thus zero when the input is exactly 90° offset from the gate control clock voltage 110. It rapidly develops a positive voltage if leading in phase or a negative voltage if it is lagging in phase. A resistor-capacitor filter combination 114 and 116 sets a loop-response constant of about fifty Hz for a comparator 118 operating as a zero-crossing detector. For example, a type MC34181 can be used for comparator 118. A signal line 120 will provide, e.g., an error signal that dithers up and down at approximately fifty Hz when the phase of the gate 110 is hovering about the phase of the inputs 102 and 108. A digital phase lock loop (PLL) 126 is connected to a reference oscillator 128 and provides a tracking frequency "f" which drives a down-counter 130. The oscillator 128 can be a type HA2210 with an 11.703880 MHz crystal. The PLL 126 can be a type 74HC297, with an up-down control pin connected to signal line 120. The error voltage on the up-down pin modulates the internal variable ratio down-counter of the PLL 126, so that the output of counter 130 is equal to the operational frequency on input 102. Counter 130 can be a 74HC74, programmed to act as a divide-by-four counter providing gate control (clock) output 110.

Another resistor-capacitor filter combination 122 and 124 provides a LOCK signal that is equivalent to that output by the PLL circuit 64 to ADC 66 in FIG. 2. A zero voltage indicates good lock conditions.

Each of the synchronous full-wave rectifier and filters 44, 46, 52, 54, 60 and 62 are preferably similar in design to rectifier 104 and filter combination 114 and 116 in the PLL subsystem 100, except that their gating signals are all taken from line 132 on counter 130. They are timed 90° ahead of the gating signal used to drive synchronous rectifier 104 in the PLL/clock/lock detection subsystem 100, and this operates with the gating waveform in phase with their input signals to produce maximum DC rectified outputs.

FIG. 4 represents a schematic diagram of a dual-range channel processor 150. Each pair of range-1 and range-2 rectifier-filters 44 & 46, 52 & 54, and 60 & 62, in FIG. 2, could be implemented with a dual-range channel processor 150. An antenna signal input 152, such as from $E_T$ antenna 18, $E_C$ $E_L$ $E_R$ antenna array 30, 26 and 28 or $E_B$ antenna 22 in FIG. 2, is input to a first amplifier 154 with a gain of 10.00. A buffer amplifier 156 provides a unity gain of 1.00. A precision analog inverter 158 provides a gain of −1.00 and is chopper-stabilized by an op-amp 160 which ensures that any DC offset appearing on one input to multiplexer 162, will be exactly mirrored with opposite polarity on the other input for that channel. First range output 166 will thus include no DC offset voltage from amplifiers 154, 156 and 158. An analog multiplexer 162 is controlled by a gating signal input 164 to synchronously pass through only the half-cycle outputs of unity-gain amplifier 156 and the precision analog inverter 158. The combined output is passed through as first range output 166 which is filtered by a resistor-capacitor combination 168 and 170. The first range rectified output 166 is equivalent to that of filters 44, 52, and 60 in FIG. 2.

A second channel with a higher gain comprises a first amplifier 172 with an AC gain of 15.00 followed by a second amplifier 174 also with an AC gain of 15.00. A precision analog inverter 176 provides a gain of −1.00. The analog multiplexer 162 is also controlled by the gating signal input 164 to synchronously pass through only the half-cycle non-inverted output of amplifier 174 and the precision analog inverter 176. The combined output is passed through as second range output 178 which is filtered by a resistor-capacitor combination 180 and 182. The second range output 178 is equivalent to that of filters 46, 54, and 62 in FIG. 2. The precision analog inverter 176 can also be chopper-stabilized by a circuit similar to that of op-amp 160, e.g., instead of having its non-inverting input simply tied to signal ground.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A locator for the continuous measurement of the depths of underground objects from the surface, comprising:

an antenna array that can be positioned at a point near a surface overlying an underground object that is radiating an electromagnetic wave;

a top and a bottom antenna included in the antenna array and having a known separation distance between them, and respectively providing for a first and a second received alternating current (AC) electrical signal that are each representative of a first field strength and a second field strength of said electromagnetic wave at corresponding points in space;

a phase-locked loop (PLL) for synthesizing a local oscillator frequency from either said first or second received AC electrical signal, wherein a gating signal is produced that is synchronized to a harmonic frequency of said first or second received AC electrical signal;

a first network for connecting said first received AC electrical signal to produce a first inverted and a first non-inverted AC signal representative of said electromagnetic wave at said top antenna;

a second network for connecting said second received AC electrical signal to produce a second inverted and a second non-inverted AC signal representative of said electromagnetic wave at said bottom antenna;

a first analog signal switch connected to said gating signal and providing for alternatively switching between said first inverted and said first non-inverted AC signals to produce a first full-wave rectified direct current (DC) signal;

a second analog signal switch connected to said gating signal and providing for alternatively switching between said second inverted and said second non-inverted AC signals to produce a second full-wave rectified DC signal in parallel with and independent from said first full-wave rectified direct current (DC) signal; and a computer providing for a continuous and real-time estimate of said depth of said underground object to a user by equating a first field strength associated with said top antenna to an electrical magnitude of said first full-wave rectified DC signal, and equating a second field strength associated with said bottom antenna to an electrical magnitude of said second full-wave rectified DC signal, wherein a continuous real-time comparison is made between said first field strength to said second field strength to estimate a depth of said underground object from which said electromagnetic wave is radiating.

2. A locator for measuring the depths of underground objects from the surface, comprising:

an antenna array that can be positioned at a point near a surface overlying an underground object that is radiating an electromagnetic wave;

a top and a bottom antenna included in the antenna array and having a known separation distance between them, and respectively providing for a first and a second received alternating current (AC) electrical signal that are each representative of a first field strength and a second field strength of said electromagnetic wave at corresponding points;

a phase-locked loop (PLL) for synthesizing a local oscillator frequency from either said first or second received AC electrical signal, wherein a gating signal is produced that is synchronized to the frequency of said first or second received AC electrical signal;

a first network for connecting said first received AC electrical signal to produce a first inverted and a first non-inverted AC signal representative of said electromagnetic wave at said top antenna;

a second network for connecting said second received AC electrical signal to produce a second inverted and a second non-inverted AC signal representative of said electromagnetic wave at said bottom antenna;

a first analog signal switch connected to said gating signal and providing for synchronously switching between said first inverted and said first non-inverted AC signals to produce a first full-wave rectified direct current (DC) signal;

a second analog signal switch connected to said gating signal and providing for synchronously switching between said second inverted and said second non-inverted AC signals to produce a second full-wave rectified DC signal; and a computer for equating a first field strength associated with said top antenna to an electrical magnitude of said first full-wave rectified DC signal, and further for equating a second field strength associated with said bottom antenna to an electrical magnitude of said second full-wave rectified DC signal, and wherein a comparison is made between said first field strength to said second field strength to estimate a depth of said underground object from which said electromagnetic wave is radiating.

3. The locator of claim 2, wherein:

the computer provides a continuous and real-time estimate of said depth of said underground object to a user.

4. The locator of claim 2, wherein:

said first and second full-wave rectified DC signals are produced in parallel and periodically converted by an analog-to-digital converter with an input multiplexer for input to the computer as digital values.

5. The locator of claim 2, wherein:

the computer includes a memory in which are stored calibration values and a program for using said calibration values during operation to reduce any gain and offset errors caused by said first and second full-wave rectified DC signals having been received and processed by different antennas and electronic circuits in parallel.

6. The locator of claim 2, further comprising:

a plumb-level sensor for indicating to the computer when the top and bottom antenna are plumb to one another.

7. A method for measuring a power level of an exceedingly faint electrical signal, comprising:

synthesizing a local oscillator frequency from an exceedingly faint alternating current (AC) electrical signal obtained from an input port, wherein a gating signal is produced that is synchronized to the frequency of said sample;

connecting said input port to produce an inverted and a non-inverted alternating current (AC) signal representative of said sample;

using said gating signal to synchronously switch between said inverted and said non-inverted AC signals to produce a full-wave rectified direct current (DC) signal; and equating a signal strength measurement to an electrical magnitude of said full-wave rectified DC signal.

8. A method for determining the field strength of an electromagnetic wave at two different points in space, comprising:

positioning a first antenna to receive an electromagnetic wave at a first point in space;

positioning a second antenna to receive said electromagnetic wave at a second point in space;

synthesizing a local oscillator frequency from said electromagnetic wave obtained from said first or second antenna wherein a gating signal is produced that is synchronized to said electromagnetic wave;

connecting said first antenna to produce a first inverted and a first non-inverted alternating current (AC) signal representative of said electromagnetic wave at said first point in space;

connecting said second antenna to produce a second inverted and a second non-inverted AC signal representative of said electromagnetic wave at said second point in space;

using said gating signal to alternately switch between said first inverted and said first non-inverted AC signals to produce a first full-wave rectified direct current (DC) signal;

using said gating signal to alternately switch between said second inverted and said second non-inverted AC signals to produce a second full-wave rectified DC signal;

equating a first field strength associated with said first point in space to an electrical magnitude of said first full-wave rectified DC signal; and equating a second field strength associated with said second point in space to an electrical magnitude of said second full-wave rectified DC signal.

9. The method of claim 8, further comprising:

comparing said first field strength to said second field strength to estimate a third point or line in space from which said electromagnetic wave is radiating.

10. The method of claim 8, wherein:

the steps of using gating signal to alternatively switch between inverted and non-inverted AC signals includes the use of an analog signal multiplexer.

11. The method of claim 8, wherein:

the step of synthesizing a local oscillator frequency includes the use of a phase-locked loop and outputting a "LOCK" signal to indicate to a microcomputer that said electromagnetic wave is being received and tracked.

* * * * *